United States Patent
Bigorra Llosas et al.

(10) Patent No.: US 8,197,588 B2
(45) Date of Patent: Jun. 12, 2012

(54) USE OF AMIDES AND/OR POLYAMIDES AS AUXILIARY AGENTS FOR ASPHALT AND BITUMEN COMPOSITIONS

(75) Inventors: Joaquin Bigorra Llosas, Sabadell (ES); Ramon Valls, Barcelona (ES); Stéphanie Merlet, Corbeil-Essonnes (FR); Jean-Pierre Molitor, Buthiers (FR)

(73) Assignee: Cognia IP Management GmbH, Duesseldorf (DE)

( * ) Notice: Subject to any disclaimer, the term of this patent is extended or adjusted under 35 U.S.C. 154(b) by 0 days.

(21) Appl. No.: 12/918,170

(22) PCT Filed: Feb. 11, 2009

(86) PCT No.: PCT/EP2009/000934
§ 371 (c)(1),
(2), (4) Date: Sep. 22, 2010

(87) PCT Pub. No.: WO2009/103445
PCT Pub. Date: Aug. 27, 2009

(65) Prior Publication Data
US 2011/0118391 A1    May 19, 2011

(30) Foreign Application Priority Data
Feb. 20, 2008  (EP) .................................... 08003063

(51) Int. Cl.
*C08L 95/00*    (2006.01)

(52) U.S. Cl. .......................................... 106/277; 524/61
(58) Field of Classification Search .............. 524/59–62; 106/277
See application file for complete search history.

(56) References Cited

U.S. PATENT DOCUMENTS

| | | | | |
|---|---|---|---|---|
| 2,383,130 | A * | 8/1945 | Jaeger et al. | 562/106 |
| 3,062,829 | A * | 11/1962 | Wright et al. | 516/43 |
| 4,242,143 | A | 12/1980 | Hagenbach et al. | |
| 4,571,412 | A * | 2/1986 | Minamida et al. | 524/64 |
| 4,576,648 | A * | 3/1986 | Demangeon et al. | 106/269 |
| 4,780,146 | A * | 10/1988 | Chang | 106/284.4 |
| 5,034,060 | A * | 7/1991 | Schilling et al. | 106/277 |
| 2003/0061968 | A1 * | 4/2003 | Matherly et al. | 106/281.1 |
| 2003/0109606 | A1 * | 6/2003 | Khan et al. | 524/59 |
| 2003/0231928 | A1 | 12/2003 | Hildebrand et al. | |
| 2006/0041101 | A1 * | 2/2006 | Heinrichs et al. | 528/310 |

FOREIGN PATENT DOCUMENTS

| | | |
|---|---|---|
| AU | 435765 | 5/1973 |
| WO | 2004/108830 | 12/2004 |
| WO | 2005/081775 | 9/2005 |

* cited by examiner

*Primary Examiner* — Peter Szekely
(74) *Attorney, Agent, or Firm* — Diehl Servilla LLC

(57) ABSTRACT

Suggested is the use of amides and/or polyamides obtainable by condensation of (a) mono- and/or dicarboxylic acids and (b) amines and/or polyamines as auxiliary agents for aqueous asphalt and bitumen compositions.

10 Claims, No Drawings

USE OF AMIDES AND/OR POLYAMIDES AS AUXILIARY AGENTS FOR ASPHALT AND BITUMEN COMPOSITIONS

FIELD OF THE INVENTION

The present invention is related to the area of road construction and refers to the use of amides and polyamides as auxiliary agents, in particular low-temperature binders for asphalt and bitumen compositions and corresponding compositions.

BACKGROUND OF THE INVENTION

The reduction of atmospheric emissions is considered to be one of the major trends of the first decade of the new millennium. All over the world industry is looking for products being more environmental save, liberating less volatiles and showing improved biodegradability. This is particular true for those areas of application needing high working temperatures, as for example road construction. Temperatures of typically 150° C. and above are necessary to allow the binders in the asphalt or bitumen compositions to become viscous enough in order to coat the particles completely. It is of course desirous to work at lower temperatures since this saves energy costs and reduces the unwanted emission from burning fuel, fumes and odours generated at the plant and paving site.

From the state of the art several technologies are known allowing the reduction of temperature in the treatment of asphalt and bitumen compositions by using special "low-temperature binders". For example, WO 2004/108830 A1 (SMAC) suggests to use certain hydrocarbon waxes, while U.S. Pat. No. 4,242,143 B2 (Elf) discloses for the same purpose polyolefins and US 2003/0231928 A1 (Sasol) paraffins obtained from the Fischer-Tropsch synthesis.

Therefore it has been the object of the present invention to develop new auxiliary agents for asphalt, bitumen or bitumen emulsions, especially for application in road construction, providing binders with excellent coating performance even at temperatures of about 100 to 120° C.

DETAILED DESCRIPTION OF THE INVENTION

The present invention refers to the use of amides and/or polyamides obtainable by condensation of
(a) mono- and/or dicarboxylic acids and
(b) amines and/or polyamines
as auxiliary agents, especially low-temperature binders, fluxants, as asphalt and bitumen viscosity reducers and in aqueous asphalt and bitumen emulsions.

Surprisingly it has been observed that said (poly)amides represent efficient binders for asphalt and bitumen, having the ability to coat the particles completely at significant lower temperatures. The decrease of working temperature generates benefits in costs and for the environment too, since energy is saved and emissions reduced.

Asphalt and Bitumen

In the following, the terms asphalt and bitumen are used to describe natural or petroleum-derived bitumen including the well-known penetration grade bitumen, blown or oxidised grades and polymer-modified bitumen, for example, modified with styrene-butadiene polymers or ethylene vinyl acetate polymers. Examples are those having a softening point (Ring and Ball) from 20, preferably from about 50 to about 200° C. Also preferred are those starting materials exhibiting a penetration Index (UNE-EN 1426) at 25° C. between about 30 and about 330.

Amides and Polyamides

The amides and polyamides according to the present invention may be obtained by condensation of monocarboxylic acids and/or dicarboxylic acids on one hand and amines and/or polyamines on the other. Preferably, the amides or polyamides show melting points in the range of about 60 to about 140° C. Typically, they are added in amounts of about 0.15 to 15, preferably 0.5 to 8% b.w. calculated on the final asphalt or bitumen emulsion. The condensation of the acids component and the amine component can take place according to standard methods of organic chemistry which are well known from the art. In particular, it is desirous to use an over-stoichiometric excess of one of the compounds—usually the amine—and to separate the water of condensation continuously in order to shift the equilibrium of the reaction towards the condensation products. Subsequently, non-reacted starting material is separated from the final amide or polyamide for example by distillation at elevated temperatures and/or reduced pressure. In the following the types of starting materials are described in more detail:

Monocarboxylic Acids

The (poly)amides according to the present invention may be derived from monocarboxylic acids according to general formula (I),

$$R^1CO\text{---}OH \tag{I}$$

in which $R^1CO$ stands for a linear or branched acyl radical having 6 to 22, preferably 8 to 18 and more preferably 10 to 18 carbon atoms and 0 or 1 to 3 double bonds. Typical examples are caproic acid, caprylic acid, 2-ethyl hexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and the technical mixtures thereof obtained, for example, in the pressure hydrolysis of natural fats and oils, in the reduction of aldehydes from Roelen's oxosynthesis or in the dimerization of unsaturated fatty acids. Technical fatty acids containing 12 to 18 carbon atoms, for example, coconut oil, palm oil, palm kernel oil or tallow fatty acids, preferably in hydrogenated or partially hydrogenated form, are preferred. Also preferred are unsaturated fatty acids like oleic acid or erucic acid.

Dicarboxylic Acids

The (poly)amides according to the present invention may be derived from dicarboxylic acids according to general formula (II),

$$HOOC\text{---}[X]\text{---}COOH \tag{II}$$

in which [X] stands for an optionally hydroxysubstituted alk(en)ylene group having 1 to 10, preferably 1 to 4 carbon atoms. Typical examples are succinic acid, maleic acid, glutaric acid, 1,12-dodecanedioic acid and, in particular, adipic acid. In another preferred embodiment of the present invention mixtures of mono- and dicarboxylic acids are used Amines The (poly)amides according to the present invention may be derived from amines according to general formula (III),

$$R^2\text{---}NH\text{---}R^3 \tag{III}$$

in which $R^2$ and $R^3$ stands for hydrogen or a linear or branched, aliphatic or aromatic, saturated or unsaturated, optionally hydroxy-substituted hydrocarbon radical having 1 to 22, preferably 1 to 2 carbon atoms. Typical examples are ammonia, methylamine, ethylamine, dimethylamine, ethanolamine, dibutylamine and their mixtures.

Polyamines

The (poly)amides according to the present invention may be derived from di- or polyamines according to general formula (IV),

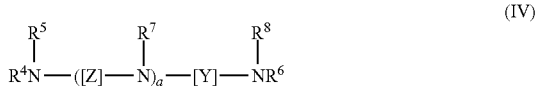

in which $R^4$, $R^5$, $R^6$, $R^7$, and $R^8$ independently stand for hydrogen, alkyl and/or hydroxyalkyl radicals having 1 to 4 carbon atoms, [Y] and [Z] represent linear or branched alkylene radicals having 1 to 6 carbon atoms, and a stands for 0 or an integer of 1 to 6. Typical examples are dimethylaminepropylamine, dietilentriamine, etilendiamine, trietilentetraamine, dipropilentriamine, propilendiamine.

INDUSTRIAL APPLICATION

In order to low the working temperature of bitumen in warm mix asphalt, but also for cold mix asphalt, the present invention refers of a composition for road construction, comprising:

(a) Asphalt or bitumen,
(b) Amides and/or polyamides as set out above, and optionally
(c) Non-ionic, cationic and/or amphoteric co-emulsifiers, and/or
(d) Solvents.

More particular the emulsions comprise (a) about 10 to about 70, preferably about 20 to about 40% b.w. asphalt or bitumen,
(b) about 0.15 to about 15, preferably about 0.2 to about 1% b.w. amides and/or polyamides
(c) 0 to about 5, preferably about 1 to about 4% b.w. non-ionic, cationic and/or amphoteric co-emulsifiers, and/or
(d) 0 to about 40, preferably about 5 to about 30% b.w. solvents.

under the condition that the amounts add with water and optionally additional typical auxiliary agents to 100% b.w.

Co-Binders

In another embodiment of the present invention it has been found advantageous to use the amides or polyamides in combination with non-ionic, cationic or amphoteric co-binders or co-emulsifiers (component c) in order to increase viscosity reduction. Most preferred is the use of amphoteric co-emulsifiers of the betaine type, like for example alkyl betaines, alkylamido betaines, imidazolins and amphoglycinates.

Alkyl Betaines

The betaines are known surfactants which are mainly produced by carboxyalkylation, preferably carboxymethylation, of amine compounds. The starting materials are preferably condensed with halocarboxylic acids or salts thereof, more particularly sodium chloroacetate, one mole of salt being formed per mole of betaine. The addition of unsaturated carboxylic acids, such as acrylic acid for example, is also possible. Examples of suitable betaines are the carboxyalkylation products of secondary and, in particular, tertiary amines which correspond to formula (V):

where $R^9$ is a an alkyl radical having 6 to 22 carbon atoms, $R^{10}$ is hydrogen or an alkyl group containing 1 to 4 carbon atoms, $R^{11}$ is an alkyl group containing 1 to 4 carbon atoms, q1 is a number of 1 to 6 and Z is an alkali and/or alkaline earth metal or ammonium. Typical examples are the carboxymethylation products of hexylmethylamine, hexyldimethylamine, octyldimethylamine, decyldimethylamine, $C_{12/14}$-cocoalkyldimethylamine, myristyldimethylamine, cetyldimethylamine, stearyldimethylamine, stearylethylmethylamine, oleyldimethylamine, $C_{16/18}$-tallowalkyldimethylamine and their technical mixtures, and particularly dodecyl methylamine, dodecyl dimethylamine, dodecyl ethylmethylamine and technical-commercially available products include Dehyton® AB (Cognis Deutschland GmbH & Co., KG)

Alkylamido Betaines

Other suitable betaines are the carboxyalkylation products of amidoamines which correspond to formula (VI):

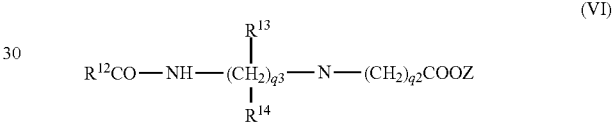

in which $R^{12}CO$ is an aliphatic acyl radical having 6 to 22 carbon atoms and 0 or 1 to 3 double bonds, $R^{13}$ is hydrogen or an alkyl radical having 1 to 4 carbon atoms, $R^{14}$ is an alkyl radical having 1 to 4 carbon atoms, q2 is a number from 1 to 6, q3 is a number from 1 to 3 and Z is an alkali and/or alkaline earth metal or ammonium. Typical examples are reaction products of fatty acids having 6 to 22 carbon atoms, like for example caproic acid, caprylic acid, caprinic acid, lauric acid, myristic acid, palmitic acid, palmoleic acid, stearic acid, isostearic acid, oleic acid, elaidic acid, petroselinic acid, linolic acid linoleic acid, elaeostearic acid, arachidonic acid, gadoleic acid, behenic acid, erucic acid and their technical mixtures with N,N-dimethylaminoethylamine, N,N-dimethylaminopropylamine, N,N-diethylaminoethylamine and N,N-diethylaminopropylamine, which are condensed with sodium chloroacetate. The commercially available products include Dehyton® K and Dehyton® PK (Cognis) as well as Tego®Betaine (Th.Goldschmidt).

Imidazolines

Other suitable starting materials for the amphoterics to be used for the purposes of the invention are imidazolines. These substances are also known and may be obtained, for example, by cyclizing condensation of 1 or 2 moles of $C_6$-$C_{22}$ fatty acids with polyfunctional amines, such as for example aminoethyl ethanolamine (AEEA) or diethylenetriamine. The corresponding carboxyalkylation products are mixtures of different open-chain betaines. Typical examples are condensation products of the above-mentioned fatty acids with AEEA, preferably imidazolines based on lauric acid, which are subsequently reacted with sodium chloroacetate. The commercially available products include Dehyton® G (Cognis).

Primary binders and co-binders may be applied in ratios by weight of about 50:50 to about 90:10, preferably about 60:40 to about 80:20.

Solvents

It is advisable to use non-polar solvents in warm mix asphalt or to obtain a better emulsion, with less viscosity and better stability. This optional component (d) may be selected, for example, from mineral oils, hydrocarbons, fatty acid lower alkyl esters such as, for example, the lower alkyl (C1-C4) esters, i.e. methyl, ethyl, propyl and/or butyl esters, of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof. Vegetable triglycerides, for example coconut oil, palm oil, palm kernel oil, sunflower oil, olive oil and the like are also suitable.

EXAMPLES

Manufacturing Example H1

Preparation of Adipic Acid Dimethylamide 1,197 g (8.2 moles) adipic acid was placed in a reactor equipped with a distillation and a gas absorption system and heated under nitrogen. Once the temperature reached about 180° C. gaseous dimethylamide was led into the mixture and the temperature raised to about 220° C. The addition of dimethylamide was continued until the acid number dropped down to a value below 15 mg KOH/g. The resulting adipic acid dimethylamide was purified by distillation at about 190° C. and a reduced pressure of about 5 mbar. The distillate showed an acid value of below 7 and a melting point of 80° C.

Examples 1 to 6

Rheological Properties of Bitumen Additives

Bitumen was mixed with several additives and the viscosity was determined according to the Brookfield method (RVT, Spindle 1, 10 rpm) at different temperatures. The details are compiled in Table 1:

TABLE 1

Viscosity of bitumen compositions

| | | Conc. | Viscosity [mPas] | | |
|---|---|---|---|---|---|
| Ex. | Additive | [% b.w.] | 90° C. | 120° C. | 150° C. |
| | none | — | 6,300 | 840 | 180 |
| 1 | Oleic acid monoamide | 3 | 900 | 220 | 50 |
| 2 | Oleic acid monoamide | 5 | 600 | 150 | 50 |
| 3 | Erucic acid monoamide | 3 | 800 | 280 | 60 |
| 4 | Erucic acid monoamide | 5 | 700 | 210 | 50 |
| 5 | Adipic acid dimethylamide | 3 | 850 | 240 | 55 |
| 6 | Adipic acid dimethylamide | 5 | 600 | 200 | 40 |

As one can see the addition of the additives allows obtaining bitumen at 120° C. showing a comparable viscosity as at 150° C. without adding the binders. The examples show that using the additives according to the invention makes it possible to decrease the working temperature for bitumen by 30 to 40° C.

The invention claimed is:

1. An aqueous composition for road construction, comprising:
    (a) asphalt or bitumen,
    (b) a monoamide obtained from condensation of mono- and/or dicarboxylic acids and amines, and optionally
    (c) a non-ionic, cationic and/or amphoteric co-emulsifier, and/or
    (d) a solvent;
wherein the monocarboxylic acids are according to general formula (I), $$R^1CO\text{---}OH \quad (I)$$

in which $R^1CO$ stands for a linear or branched acyl radical having 6 to 22 carbon atoms and 0 or 1 to 3 double bonds, and the dicarboxylic acids are according to general formula (II), $$HOOC\text{---}[X]\text{---}COOH \quad (II)$$

in which [X] stands for an alk(en)ylene group having 1 to 10 carbon atoms that is optionally hydroxysubstituted.

2. The aqueous composition according to claim 1, comprising
    (a) 10 to 70% b.w. asphalt or bitumen,
    (b) 0.15 to 15% b.w. monoamide
    (c) 0 to 5% b.w. non-ionic, cationic and/or amphoteric co-emulsifier and/or
    (d) 0 to 40% b.w. solvent,
under the condition that the amounts add with water to 100% b.w.

3. The aqueous composition according to claim 1, comprising as cobinder (component c), betaine or imidazolines.

4. The aqueous composition according to claim 1, comprising solvent (component d) selected from the group consisting of mineral oils, hydrocarbons, fatty acid $C_1$-$C_4$ alkyl esters and vegetable triglycerides.

5. The aqueous composition according to claim 2, comprising as co-binder (component c), betaine or imidazolines.

6. the aqueous composition according to claim 5, comprising solvent (component d) selected from the group consisting of mineral oils, hydrocarbons, fatty acid $C_1$-$C_4$ alkyl esters and vegetable triglycerides.

7. The aqueous composition according to claim 2, comprising solvent (component d) selected from the group consisting of mineral oils, hydrocarbons, fatty acid $C_1$-$C_4$ alkyl esters and vegetable triglycerides.

8. The aqueous composition according to claim 3, comprising solvent (component d) selected from the group consisting of mineral oils, hydrocarbons, fatty acid $C_1$-$C_4$ alkyl esters and vegetable triglycerides.

9. The aqueous composition according to claim 1, wherein said monoamide is derived from amines according to general formula (III), $$R^2\text{---}NH\text{---}R^3 \quad (III)$$

in which $R^2$ and $R^3$ stands for hydrogen or a linear or branched, aliphatic or aromatic, saturated or unsaturated, optionally hydroxy-substituted hydrocarbon radical having 1 to 22 carbon atoms.

10. The composition of claim 1, wherein the monoamide reduces the viscosity of the composition by more than 65% at 120° C.

* * * * *